UNITED STATES PATENT OFFICE.

HENRY BACON, OF CHARLESTON, MAINE.

MANUFACTURE OF ARTIFICIAL STONE AND CEMENT.

SPECIFICATION forming part of Letters Patent No. 368,269, dated August 16, 1887.

Application filed November 13, 1886. Serial No. 218,822. (No specimens.)

*To all whom it may concern:*

Be it known that I, HENRY BACON, of Charleston, in the county of Penobscot and State of Maine, have invented certain new and useful Improvements in the Manufacture of Artificial Stone and Marble; and I hereby declare the following to be a full, clear, and exact description thereof.

To produce a variety of cheap and beautiful imitations of natural stone and marble which shall possess extreme hardness, combined with great strength and durability, is the object of my invention, which consists in an artificial stone or marble composed of sand or gravel and Portland or other cement, or of pulverized gypsum, or Keene's or other similar cement, with or without pigments for coloring the same, combined with a liquid compound or solution formed of certain chemical ingredients, as hereinafter set forth, whereby a hard and durable crystallized and carbonized or petrified substance is produced which will successfully resist the action of fire, frost, and water, and is capable of receiving a high polish, thus specially adapting it for use as a building material in any climate, and for a great variety of other purposes, as hereinafter more particularly set forth.

In carrying my invention into effect I take a suitable vessel and place therein the following ingredients, in about the proportions named: three pounds of ferro-cyanide of potassium, commonly known as "prussiate of potash," one pound of caoutchouc, two pounds of chloride of lime, and two quarts of spirits of ammonia. These ingredients are dissolved in their proper solvents, and the whole is thoroughly mixed and incorporated together, after which I add one hundred gallons of water. To make artificial stone for building and other purposes, I take ten parts (more or less) of fine sharp silicious sand or gravel and one part of Portland or other suitable cement, and after intimately mixing them together, with or without pigments for coloring the same, I thoroughly dampen the mixture with the above-described liquid compound or solution until it is brought into a plastic or semi-plastic condition, after which it is placed in suitable molds to give it any desired form or shape, and tamped or otherwise compressed therein in the ordinary well-known manner. After the stone is removed from the mold, it is allowed to stand for three or four days, according to the climate, and during this time it should be dampened occasionally with the liquid compound above described. I next have a vat or receptacle in which I place about one hundred gallons of water, and add thereto four quarts of oil of vitriol and three pounds of chloride of life, stirring the whole until the latter substance is dissolved. After the stone has stood three or four days, as above described, I submerge all small pieces of the same in this latter liquid compound or mixture for two or three days, which has the effect of bleaching it and rendering the color uniform, while it also neutralizes the salts, so that no effects of effervescence will ever appear upon the surface of the stone. In the case of heavy pieces of the said artificial stone, or where the said artificial-stone compound is used as concrete for sidewalks, &c., I sprinkle the surface with the last-named solution two or three times a day for three days, which has the effect of making each stone or the concrete surface of uniform color. This finishes the stone, which then becomes perfectly crystallized and carbonized or petrified, whereby it is rendered impervious to water and extremely hard and durable, the particles adhering together with the greatest tenacity, and the mass becoming harder and more solidified the longer it stands, thus enabling it to successfully resist the action of fire, frost, and moisture, and adapting it for use where it is subjected to hard wear and usage—as, for instance, pavements.

To manufacture imitations of the different varieties of marble, I place a mold of the desired shape upon any smooth surface, oiling the same so that the material will not adhere to the bottom or sides of the mold. I then take finely-pulverized gypsum or Keene's or Martin's cement and mix the same with suitable pigments to produce any color or colors required to imitate the different varieties of marble, and then dampen the mass with the first-named chemical solution until it has the consistency of dough. I then roll this into layers or sheets, and cut it into small pieces or strips from the size of a thread to a cord, placing them on the smooth surface in the bottom and sides of the mold in a zigzag manner, to imitate the different lines and veins of the desired variety of marble. I then mix in separate bowls any desired colors of the last-named cements, and dampen or wet the same with my first-named solution until it is of the consistence of paste, when I splash the same upon the smooth surfaces forming the sides and bottom of the mold, so that it will adhere to the veins and cover the entire surface of the mold to the thickness of about one-fourth of an inch, after which it is allowed to remain until set, when I fill the mold to a level with the top with Portland cement and fine sharp sand in suitable proportions, mixed with the first-named chemical solution. I allow this to dry, and then take the mold from the marble and fill in the pores with Keene's cement mixed with any desired color, and when the latter becomes dry I rub down the surface first with coarse sandstone and then with a fine stone, termed "snake-stone," which produces a fine finish. After the surface is thoroughly dry and hard, I take a piece of coarse felt cloth and saturate the same with lard-oil and sprinkle putty-powder upon the felt, and go over the surface with the same until a beautiful and exquisite polish is obtained. I then clean off the marble and place pure lard-oil on the same, and allow it to stand in a warm place, and rub the same down with a clean cloth, when the marble is finished and ready for use.

The above-described artificial stone and marble, crystallized and carbonized or petrified by the chemical treatment set forth, is adapted for use in any climate for building materials, sidewalks, pavements, sewer-pipes, culverts, chimneys and chimney-tops, monuments and other cemetery work, vases, wainscoting, lining for stoves, piers for bridges, and for an infinite variety of other articles and purposes, or wherever natural stone or marble can be employed.

What I claim as my invention, and desire to secure by Letters Patent, is—

1. The herein-described liquid compound, consisting of prussiate of potash, dissolved caoutchouc, chloride of lime, spirits of ammonia, and water, substantially in the proportions named, for the purpose of producing the crystallization and carbonization of the artificial stone or marble, as described.

2. The herein-described liquid compound, consisting of water, oil of vitriol, and chloride of lime, substantially in the proportions named, for the purpose of bleaching the artificial stone and rendering the same of uniform color, as set forth.

Witness my hand this 11th day of November, A. D. 1886.

HENRY BACON.

In presence of—
P. E. TESCHEMACHER,
CHARLES GAGE.